Patented May 26, 1936

2,042,194

UNITED STATES PATENT OFFICE 2,042,194

STRIPPING DYEINGS PREPARED WITH VAT DYESTUFFS

Conrad Schoeller, Ludwigshafen-on-the-Rhine, Germany, assignor to General Aniline Works, Inc., New York, N. Y., a corporation of Delaware No Drawing. Application March 14, 1933, Serial No. 660,776. In Germany March 23, 1932

8 Claims. (Cl. 8—2)

The present invention relates to the stripping of dyeings prepared with vat dyestuffs.

It has already been proposed to strip vat dyeings from fibres by treating the dyed fabrics, yarns or woven goods in a bath which contains alkali and a reducing agent, as for example alkali metal hydrosulphite. The reduced dyestuff passes in part into the bath, but also partly goes on to the fabric again, so that frequently only an insufficient action is obtained.

I have now found that dyeings prepared from vat dyestuffs can be stripped in an advantageous manner by means of baths containing alkaline reducing agents, such as hydrosulphites, by adding to the stripping bath towards the end of the treatment such magnesium compounds as are capable of forming magnesium hydroxide in alkaline media. The said magnesium compounds comprise for example magnesium acetate, nitrate or hydroxide itself and, preferably, magnesium sulphate or magnesium chloride.

Especially favourable effects can be obtained by adding to the stripping baths water-soluble protective colloids, these substances having a strong tendency to prevent the leuco compounds of the vat dyestuffs from going on to the fibres again. The said protective colloids comprise for example inspissated sulphite waste liquor, glue, gelatine, soft roe, regrated albuminous substances, such as lysalbinic or protalbinic acids, the reaction products of such acids with fatty acid chlorides such as stearic or oleic acid chloride, sericine, boiled off soap, and especially condensation products of ethylene oxide with water-insoluble or difficultly soluble organic compounds containing at least one reactive hydrogen atom and at least 6 carbon atoms, such as fatty acids, for example lauric, palmitic, oleic, linoleic, ricinoleic, montanic, naphthenic and abietic acids, or with mixtures of fatty acids contained in fatty oils, such as for example coconut oil or palm kernel oil and the fatty acids obtainable by partial oxidation of paraffin wax by blowing with oxygen containing gases at about 160° C. The said condensation products may also be obtained from the alkyl, hydroxy alkyl or hydroxy amino alkyl esters of the said acids, in which case the ethylene oxide displaces the alkyl groups and/or reacts with the hydrogen atoms of the hydroxy groups. The ethylene oxide may also be reacted with amides of the said acids or with the reaction products of long chain fatty acid chlorides with amino carboxylic acids, such as for example those obtained by reacting oleic or stearic chloride with glycocoll, sarcosine or protalbinic acid. Similar condensation products can also be obtained by reacting ethylene oxide with alcohols containing at least 10 carbon atoms such as oleic or lauric alcohols, or montanol, and also with alkyl amines containing at least 6 carbon atoms, or arylated derivatives thereof, such as for example octodecyl amine, oleyl amine, hydroxyethyl dodecyl aniline, octodecyl alpha-naphthyl amine and the like. Aromatic hydroxy compounds containing at least 10 carbon atoms, such as beta-naphthol, or aromatic amines, such as alpha or beta-naphthyl amine, may likewise be reacted with ethylene oxide to produce the said condensation products. Similarly, products of natural origin having a very high molecular weight, and at least one reactive hydrogen atom, such as casein, gelatine or glue, and carbohydrates such as starch or cellulose may likewise be reacted with ethylene oxide to form most valuable protective colloids of the kind defined.

Instead of reacting the said water-insoluble or difficultly soluble substances with ethylene oxide, ethylene halogen hydrins such as ethylene chlorhydrin, ethylene bromhydrin or ethylene iodhydrin, or also polyglycerol or epihalogenhydrins such as epichlorhydrin, epibromhydrin or epiiodhydrin, may be reacted with the said organic compounds. Such products may be prepared for example according to the methods described in the British specifications Nos. 368,530 and 380,431.

Instead of, or in conjunction with, the said protective colloids, polymerization products of waxy consistency obtained from ethylene oxide, for example according to the process of the British specification No. 346,550 may be employed for preventing the leuco compounds of the vat dyestuffs from going on to the fibres again.

The said protective colloids are preferably added to the initial stripping bath in an amount of from about 1 to about 30, preferably of from about 2 to about 10 grams, per liter of said bath.

The stripping process is usually carried out at temperatures between about 60° C. and the boiling temperature of the bath. The amounts of alkali, hydrosulphite and the said protective colloids and magnesium compounds, and also the temperature of the stripping bath and the duration of the treatment are varied within the said limits, depending on the peculiar circumstances, as for example on the depth of the dyeing to be stripped.

The stripping baths according to the present invention usually comprise, per each litre of water, from about 1 to about 60 grams, preferably from about 3 to about 10 grams of one of the said magnesium compounds; from about 12 to about 20 grams of an aqueous caustic soda solution of 38° Bé. and from about 3 to about 10 grams of sodium hydrosulphite ($Na_2S_2O_4$) and from about 1 to about 30, preferably from about 2 to about 10 grams of one of the aforesaid protective colloids. Instead of sodium hydrosulphite the corresponding potassium salt or a corresponding amount of sodium sulphoxylate or of glucose may be employed. Similarly, caustic potassium may be employed instead of caustic soda.

The following examples will further illustrate the nature of this invention but the invention is not restricted to these examples. The parts are by weight.

Example 1

A cotton fabric dyed with 20 per cent Indanthrene Blue 5 G Paste (see Schultz, Farbstofftabellen, 1931, No. 1238) is treated for half an hour at the boiling temperature in a bath containing 12 parts of caustic soda of 40° Bé. strength and 4 parts of sodium hydrosulphite in each 1000 parts of water. 10 parts of crystallized magnesium sulphate are then added to the bath and the fabric is treated for another half an hour at the same temperature. The fabric is then rinsed, preferably with water which contains a little sodium hydrosulphite, and dried. The dyeing has been stripped to a very great extent.

Example 2

A cotton fabric which has been dyed with 10 per cent Indanthrene Brilliant Green B double paste (ibid., No. 1269) is treated at from 90° to 95° C. for half an hour in a bath containing in 1000 parts of water 12 parts of caustic soda solution of 40° Bé. strength and 4 parts of sodium hydrosulphite; the bath also contains 3 parts of a product obtained by the polymerization of ethylene oxide in the presence of alkali. 10 parts of magnesium chloride are then added and the fabric treated for another half an hour at the same temperature. The dyeing is removed to a very great extent. If the fabric be further treated for half an hour at 95° C. in a bath containing 3 parts of the calcium salt of the sulphonic acid of dimethyl-phenyl-benzyl-ammoniumsulphonic anhydride (which is described in Example 3 of the British specification No. 15722 A. D. 1910), corresponding to the formula:—

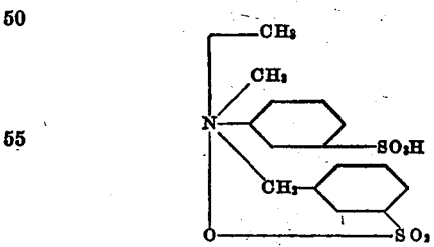

12 parts of caustic soda solution of 40° Bé. strength and 4 parts of sodium hydrosulphite in 1000 parts of water, the stripping effect is still further improved.

Example 3

A fabric which has been dyed with 10 per cent Indanthrene Brilliant Violet RR double paste (ibid., No. 1265) is treated for half an hour at from 90° to 95° C. in a bath containing 12 parts of caustic soda of 40° Bé strength, 4 parts of sodium hydrosulphite and 3 parts of the condensation product obtainable by the action of 20 molecular proportions of ethylene oxide on 1 molecular proportion of octodecyl alcohol in 1000 parts of water. 5 parts of crystallized magnesium sulphate are then added and the fabric treated for another half an hour at the same temperature. A very good stripping effect is obtained. Indigo dyeings on cotton may also be stripped in the same manner. If a dyeing obtained by dyeing artificial silk with 10 per cent Indanthrene Blue RS double paste (ibid., No. 1228) be treated in a blind vat of the composition indicated above for about half an hour at 60° C. while adding 10 parts of magnesium sulphate 10 minutes before finishing the treatment, a good stripping effect is obtained.

Example 4

A fabric which has been dyed with 4 per cent Indanthrene Blue RS (ibid., No. 1228) is treated for an hour at from 90° to 95° C. in a bath containing in 1000 parts of water 12 parts of caustic soda solution of 40° Bé. strength, 4 parts of sodium hydrosulphite and 5 parts of a condensation product derived from about 20 molecular proportions of ethylene oxide and 1 molecular proportion of oleyl alcohol or 1 molecular proportion of a coconut oil acid ethanol amide. The dyeing is thus to a great extent stripped.

Example 5

A cotton fabric which has been dyed with 10 per cent Indanthrene Brilliant Green B double paste is treated at about 90° C. for half an hour in a both containing in 1000 parts of water 15 parts of caustic soda solution of 40° Bé. strength and 5 parts of sodium hydrosulphite; the bath also contains, as a protective colloid, 3 parts of a product obtainable by the action of ethylene oxide on casein according to the process of the British specification No. 368,530. From 5 to 10 parts of recently precipitated magnesium hydroxide are then added and the fabric is treated for another half an hour at the same temperature. A very good stripping effect is obtained.

What I claim is:—

1. The process for stripping dyeings prepared with vat dyestuffs, by means of an aqueous bath containing an alkaline reducing agent, which comprises adding to the said bath towards the end of the stripping treatment a magnesium compound capable of forming magnesium hydroxide in alkaline media.

2. The process for stripping dyeings prepared with vat dyestuffs, by means of an aqueous bath containing an alkali metal hydrosulphite and caustic alkali, which comprises adding to the said bath towards the end of the stripping treatment a magnesium compound capable of forming magnesium hydroxide in alkaline media.

3. The process for stripping dyeings prepared with vat dyestuffs, by means of an aqueous bath containing sodium hydrosulphite and caustic soda, which comprises adding to the said bath towards the end of the stripping treatment a magnesium compound capable of forming magnesium hydroxide in alkaline media.

4. The process for stripping dyeings prepared with vat dyestuffs, by means of an aqueous bath containing sodium hydrosulphite and caustic soda, which comprises initially adding a protective colloid to the said bath, and adding towards the end of the stripping treatment a magnesium compound capable of forming magnesium hydroxide in alkaline media.

5. The process for stripping dyeings prepared with vat dyestuffs, by means of an aqueous bath containing sodium hydrosulphite and caustic soda, which comprises initially adding as a protective colloid a condensation product of a substance selected from the group consisting of ethylene oxide, ethylene halogen hydrins, polyglycerol and epihalogenhydrins, with a water-insoluble organic compound containing at least 6 carbon atoms and at least one reactive hydrogen atom, and adding towards the end of the stripping treatment a magnesium compound capable of forming magnesium hydroxide in alkaline media.

6. The process for stripping dyeings prepared with vat dyestuffs, by means of an aqueous bath containing sodium hydrosulphite and caustic soda, which comprises initially adding a protective colloid obtained by the action of ethylene oxide on a water-insoluble organic compound containing at least 6 carbon atoms and at least one reactive hydrogen atom, and adding towards the end of the stripping treatment a magnesium compound capable of forming magnesium hydroxide in alkaline media.

7. The process for stripping dyeings prepared with vat dyestuffs, by means of an aqueous bath containing sodium hydrosulphite and caustic soda, which comprises initially adding a protective colloid obtained by the action of ethylene oxide on an aliphatic compound containing at least 10 carbon atoms and at least one reactive hydrogen atom selected from the group consisting of aliphatic alcohols and acids, and adding towards the ends of the stripping treatment a magnesium compound capable of forming magnesium hydroxide in alkaline media.

8. The process for stripping dyeings prepared with vat dyestuffs, by means of an aqueous bath containing sodium hydrosulphite and caustic soda, which comprises initially adding a protective colloid obtained by the action of ethylene oxide on an aliphatic compound containing at least 10 carbon atoms and at least one reactive hydrogen atom, selected from the group consisting of aliphatic alcohols and acids, and adding magnesium sulphate towards the end of the stripping treatment.

CONRAD SCHOELLER.